(12) United States Patent
Kawatsu et al.

(10) Patent No.: US 8,455,675 B2
(45) Date of Patent: Jun. 4, 2013

(54) SOLUTION COMPONENT RECOVERY METHOD, SOLUTION COMPONENT RECOVERY APPARATUS, AND IMPREGNATION PROCESS/IMPREGNATION COMPONENT RECOVERY SYSTEM

(75) Inventors: Hiroyuki Kawatsu, Anjo (JP); Naoshi Ito, Tokai (JP); Yasuhiko Sugino, Nisio (JP); Mitsuo Yamamoto, Gamagori (JP); Hideo Noda, Amagasaki (JP); Goro Nishimura, Amagasaki (JP)

(73) Assignees: Aisin AW Co., Ltd., Anjo (JP); Sutai Co., Ltd., Aichi (JP); Kansai Chemical Engineering Co., Ltd., Hyogo (JP)

( * ) Notice: Subject to any disclaimer, the term of this patent is extended or adjusted under 35 U.S.C. 154(b) by 422 days.

(21) Appl. No.: 12/662,689

(22) Filed: Apr. 28, 2010

(65) Prior Publication Data

US 2010/0312007 A1  Dec. 9, 2010

(30) Foreign Application Priority Data

Jun. 3, 2009  (JP) ................................. 2009-133710

(51) Int. Cl.
*C07C 67/54* (2006.01)
(52) U.S. Cl.
USPC ........................................ 560/218
(58) Field of Classification Search
None
See application file for complete search history.

(56) References Cited

U.S. PATENT DOCUMENTS

| | | |
|---|---|---|
| 4,369,097 A | 1/1983 | Nezu et al. |
| 5,433,860 A | 7/1995 | Yasuda |
| 6,241,381 B1 | 6/2001 | Noda et al. |
| 6,334,704 B2 | 1/2002 | Noda et al. |
| 6,341,889 B1 | 1/2002 | Noda et al. |
| 6,380,424 B1 * | 4/2002 | Yoneda et al. ................ 560/209 |

FOREIGN PATENT DOCUMENTS

| | | |
|---|---|---|
| EP | 0 046 980 A1 | 3/1982 |
| JP | A-57-065304 | 4/1982 |
| JP | A-63-295693 | 12/1988 |
| JP | A-01-258702 | 10/1989 |
| JP | A-02-214501 | 8/1990 |
| JP | A 4-154822 | 5/1992 |
| JP | 04-210212 A * | 7/1992 |
| JP | A 7-24458 | 1/1995 |
| JP | A 11-235522 | 8/1999 |
| JP | A 2000-308816 | 11/2000 |
| JP | A 2005-132971 | 5/2005 |
| JP | A 2005-288373 | 10/2005 |

OTHER PUBLICATIONS

Translation of Jul. 13, 2010 International Search Report issued in PCT/JP2010/055801.

* cited by examiner

*Primary Examiner* — Paul A Zucker
(74) *Attorney, Agent, or Firm* — Oliff & Berridge, PLC

(57) ABSTRACT

A solution component recovery method, a solution component recovery apparatus, and an impregnation process/impregnation component recovery system for separating a first component from a second component. The separation between the first and second components is accomplished by reducing the pressure on a solution that contains the first component, which results in the solidification of the first component in the solution at a temperature that is equal to or higher than a predetermined solidification temperature. The second component, in which the first component is dissolved, is evaporated at a temperature range that is less than the predetermined solidification temperature. The evaporated second component is then recovered by a cooling step.

3 Claims, 4 Drawing Sheets

SOLUTION COMPONENT RECOVERY METHOD, SOLUTION COMPONENT RECOVERY APPARATUS, AND IMPREGNATION PROCESS/IMPREGNATION COMPONENT RECOVERY SYSTEM

INCORPORATION BY REFERENCE

The disclosure of Japanese Patent Application No. 2009-133710 filed on Jun. 3, 2009 including the specification, drawings and abstract is incorporated herein by reference in its entirety.

BACKGROUND OF THE INVENTION

The present invention relates to a solution component recovery method, a solution component recovery apparatus, and an impregnation process/impregnation component recovery system.

DESCRIPTION OF THE RELATED ART

In the related art, there has been proposed a solution component recovery apparatus with a water circulation system including a water tank, a pump, and an ejector, in which the pressure in a vacuum chamber into which an oil-water mixture solution is introduced by the ejector is reduced to boil the oil-water mixture solution (vaporize water) in the vacuum chamber to separate oil and water so that treated water is taken out of the vacuum pump into the water tank to be discharged (see Japanese Patent Application Publication No. JP-A-2005-288373, for example). In the apparatus, the water tank has a double structure with an inner cylinder disposed to extend from the bottom to a height below the ceiling, and is provided with a circulation water supply hole in the ceiling, a circulation water collection port in a portion of the bottom inside the inner cylinder, and a discharge port that leads the treated water to the outside in a portion of the bottom between an outer cylinder and the inner cylinder. A minute oil content is accumulated above the inner cylinder to allow better separation of the oil content from a water content.

SUMMARY OF THE INVENTION

The solution component recovery apparatus disclosed in Japanese Patent Application Publication No. JP-A-2005-288373 is provided with an inner cylinder so that an oil content is accumulated above the inner cylinder to separate the oil content from a water content, and thus is effective for solutions in which an oil content and a water content are separated. However, the effect of providing the inner cylinder in the water tank is not exerted for solutions in which components are not separated such as a solution in which a different component is dissolved in a solvent, for example, and a plurality of components may not be sufficiently separated and recovered. A solution containing a plurality of components, which are desired to be separated and recovered, may contain a component that solidifies under predetermined conditions such as temperature, for example. The solution component recovery apparatus according to Japanese Patent Application Publication No. JP-A-2005-288373 does not consider separating such a solution. Thus, it has been desired to sufficiently separate a plurality of components in order to reuse the recovered components better.

The present invention has been made in view of the foregoing issues, and it is therefore a main object of the present invention to provide a solution component recovery method, a solution component recovery apparatus, and an impregnation process/impregnation component recovery system that allow better reuse of components recovered from a solution containing a component that solidifies depending on the temperature.

In order to achieve the foregoing main object, the solution component recovery method and the solution component recovery apparatus according to the present invention adopt the following means.

That is, a first aspect of the present invention provides a method of recovering a solution component by separating a plurality of components contained in a solution for recovery, including the steps of: separating between a first component and a second component by reducing a pressure of a solution containing the first component, solidification of which progresses at a predetermined solidification temperature or higher, and the second component in which the first component is dissolved, and evaporating the second component in a predetermined separation temperature range below the predetermined solidification temperature; and recovering the second component evaporated in the separation step by cooling.

In the solution component recovery method, the pressure of a solution containing the first component, solidification of which progresses at a predetermined solidification temperature or higher, and the second component in which the first component is dissolved is reduced to evaporate the second component in a predetermined separation temperature range below the predetermined solidification temperature, and the evaporated second component is cooled and recovered. By separating the first component and the second component at a reduced pressure and in the predetermined separation temperature range as described above, solidification of the first component is prevented. Thus, the recovered components can be reused better. The "predetermined separation temperature range" is below the predetermined solidification temperature of the first component, and may be above the freezing temperature of the second component, for example.

In the solution component recovery method according to a second aspect of the present invention, the first component may be a component, solidification of which progresses in the absence of oxygen and at the predetermined solidification temperature or higher, and the second component may be evaporated by reducing the pressure of the solution while supplying oxygen to the solution in the separation step. In this way, the progress of the solidification of the first component can be suppressed better. Therefore, a component that solidifies in the absence of oxygen can also be recovered and reused better. "Supplying oxygen" may also include supplying a gas containing oxygen (for example, air) in addition to supplying oxygen.

In the solution component recovery method according to a third aspect of the present invention, the separation step may be terminated when it is determined that separation between the first component and the second component has been terminated when a temperature of the solution from which the second component is evaporated reaches a predetermined determination temperature. In this way, the termination of the separation step can be determined relatively easily using the temperature of the solution, and consequently the recovered components can be reused more easily. The "predetermined determination temperature" may be determined in accordance with the permissible content of the second component using experimentally obtained relationship of physical properties including the vapor-liquid equilibrium relationship between the first component and the second component at a predetermined pressure and the temperature rise of the solution.

In the solution component recovery method according to a fourth aspect of the present invention, the second component may be evaporated by reducing the pressure of the solution containing the first component and the second component to a predetermined reduced pressure range in which evaporation of the second component progresses but progress of evaporation of the first component is suppressed in the separation step. In this way, it is possible to suppress mixing of the first component into the recovered second component better, and thus to reuse the recovered second component better.

In the solution component recovery method according to a fifth aspect of the present invention, the first component may contain a water-soluble acrylic resin monomer, and the second component may be water. As the water-soluble acrylic resin monomer, there may be mentioned water-soluble methacrylic acid monomers and acrylic acid monomers. Examples of the methacrylic acid monomer include 2-hydroxylethyl methacrylate, 2-hydroxylpropyl methacrylate, dimethylaminoethyl methacrylate, glycidyl methacrylate, and polyethylene glycol dimethacrylate. Among these, 2-hydroxylethyl methacrylate is more preferable.

In the solution component recovery method according to a sixth aspect of the present invention, the first component may be an impregnation component that fills a void formed in a molded workpiece, and the second component may be a solvent in which the impregnation component is dissolved. In this instance, the first component may contain a water-soluble acrylic resin monomer serving as an impregnation component that fills a void formed in a molded workpiece, and the second component may be water serving as a solvent in which the impregnation component is dissolved.

A seventh aspect of the present invention also provides a solution component recovery apparatus that separates a plurality of components contained in a solution for recovery, including: a separation section formed with an internal space that stores a solution containing a first component, solidification of which progresses in the absence of oxygen and at a predetermined solidification temperature or higher, and a second component in which the first component is dissolved; an oxygen supply section connected to the separation section to supply oxygen to the solution stored in the separation section; a decompression section that reduces a pressure in the internal space of the separation section; a solution temperature adjustment section that includes a stirring section that stirs the solution stored in the separation section and a heat exchange section that exchanges heat through contact with the solution stored in the separation section to adjust a temperature of the solution to a predetermined separation temperature range below the predetermined solidification temperature; and a recovery section connected to the separation section via a connection pipe through which a fluid can flow to cool and recover the second component evaporated from the solution stored in the separation section.

In the solution component recovery apparatus, a solution containing a first component, solidification of which progresses in the absence of oxygen and at a predetermined solidification temperature or higher, and a second component in which the first component is dissolved is stored in the separation section. The pressure in the internal space of the separation section is reduced while supplying oxygen to the solution stored in the separation section, with the solution temperature adjustment section stirring the solution and adjusting the temperature of the solution to a predetermined separation temperature range below the predetermined solidification temperature, to evaporate the second component. The evaporated second component is cooled and recovered by the recovery section. By separating the first component and the second component at a reduced pressure and in the predetermined separation temperature range while supplying oxygen as described above, solidification of the first component is prevented. Thus, the recovered components can be reused better.

In the solution component recovery apparatus according to an eighth aspect of the present invention, the oxygen supply section may include a supply pipe, an opening of which is formed in a lower portion of the separation section, and a pressure adjustment section that supplies oxygen at a predetermined pressure to the supply pipe. With this configuration, the solution stored in the separation section can be supplied with oxygen in a more constant supply amount using the pressure adjustment section. Therefore, it is possible to suppress the solidification of the first component better, and consequently to reuse the first component further better. Also, the oxygen supply section may include a supply pipe connected to a lower portion of the separation section. With this configuration, oxygen can be supplied to the solution via the supply pipe when the pressure in the internal space of the separation section is reduced, which achieves a simpler configuration.

In the solution component recovery apparatus according to a ninth aspect of the present invention, a portion of the connection pipe connected to the recovery section that extends in a horizontal direction may be formed to be inclined against a horizontal plane. With this configuration, the second component condensed in the connection pipe can easily flow, for example, to better prevent the connection pipe from being blocked inside. In this instance, it is preferable that a portion of the connection pipe that extends in a horizontal direction is formed to be inclined against a horizontal plane downward from the recovery section side to the separation section side. With this configuration, a component in the connection pipe can easily flow to the separation section side, which allows the component to be subjected to another separation process in the separation section, for example, in order to be reused.

In the solution component recovery apparatus according to a tenth aspect of the present invention, the connection pipe connected to the recovery section may be formed to have a smooth curved surface. This configuration makes it easy for a component of the solution to move in the connection pipe. In particularly, it is more preferable that a portion of the connection pipe that extends in a horizontal direction is formed to be inclined against a horizontal plane.

In the solution component recovery apparatus according to an eleventh aspect of the present invention, the solution temperature adjustment section may be configured such that the heat exchange section is disposed in the vicinity of a wall surface of the separation section and the stirring section causes the stored solution to flow toward the wall surface of the separation section in order to separate the first component and the second component. With this configuration, the temperature distribution of the solution can be kept more uniform and the uniformity of the solution components can be kept better, which prevents solidification of the first component better and allows to reuse the first component further better.

In the solution component recovery apparatus according to a twelfth aspect of the present invention, the solution temperature adjustment section may determine that separation between the first component and the second component has been terminated when the temperature of the solution from which the second component is evaporated reaches a predetermined determination temperature to terminate a separation process. With this configuration, the termination of the separation process can be determined relatively easily using the temperature of the solution, and consequently the recovered components can be reused more easily.

In the solution component recovery apparatus according to a thirteenth aspect of the present invention, the first component may contain a water-soluble acrylic resin monomer, and the second component may be water. Also, in the solution component recovery apparatus according to a fourteenth aspect of the present invention, the first component may be an impregnation component that fills a void formed in a molded workpiece, and the second component may be a solvent in which the impregnation component is dissolved. In this instance, the first component may be a water-soluble methacrylic acid monomer serving as an impregnation component that fills a void formed in a molded workpiece, and the second component may be water serving as a solvent in which the impregnation component is dissolved.

A fifteenth aspect of the present invention further provides an impregnation process/impregnation component recovery system including: an impregnation bath in which a void formed in a molded workpiece is impregnated with an impregnation component serving as the first component; a cleaning bath in which the workpiece impregnated in the impregnation bath is cleaned with a solvent serving as the second component; and a solution component recovery apparatus discussed above that adopts an aspect in which a recovery process is performed on a solution containing an impregnation component serving as the first component and a solvent serving as the second component, and that stores in the separation section the solution containing the impregnation component and the solvent after cleaning performed in the cleaning bath.

Since the solution component recovery apparatus according to the present invention makes it easier to reuse the recovered components, the impregnation process/impregnation component recovery system including the solution component recovery apparatus also achieves the same effect. When the impregnation process/impregnation component recovery system adopts any of the aspects of the solution component recovery apparatus discussed above, the impregnation process/impregnation component recovery system achieves the effect corresponding to the aspect. In the impregnation process/impregnation component recovery system, after execution of a process in which a workpiece is impregnated, components contained in a solution discharged as a waste solution can be recovered in the solution component recovery apparatus to be reused.

In the impregnation process/impregnation component recovery system according to a sixteenth aspect of the present invention, the solution component recovery apparatus may supply the impregnation component serving as the first component and recovered in the separation section to the impregnation bath. With this configuration, the impregnation component can be reused more efficiently.

In the impregnation process/impregnation component recovery system according to a seventeenth aspect of the present invention, the solution component recovery apparatus may supply the solvent serving as the second component and recovered in the recovery section to the cleaning bath. In general, a solvent containing a minute amount of an impregnation component is occasionally subjected to a purification process and then disposed of. However, by utilizing the recovered solvent as a cleaning solvent for which even a solvent containing an impregnation component can be utilized as it is, the solvent can be reused more efficiently. In addition, a purification process can be dispensed with.

In the impregnation process/impregnation component recovery system according to an eighteenth aspect of the present invention, the cleaning bath may include a first cleaning bath in which the workpiece is cleaned to discharge a solution containing the first component in a predetermined concentration range, and a second cleaning bath which is disposed in a stage subsequent to the first cleaning bath and in which the workpiece cleaned in the first cleaning bath is further cleaned to discharge a solution containing the first component in a low concentration compared to the first cleaning bath, the solution discharged from the second cleaning bath being supplied to the first cleaning bath, and the solution component recovery apparatus may store the solution discharged from the first cleaning bath in the separation section to separate the first component and the second component, and supply the second component recovered in the recovery section to the second cleaning bath. With this configuration, the second component recovered in the recovery section is utilized in the second cleaning bath in which the concentration of the first component is low, the second component utilized in the second cleaning bath is further utilized in the first cleaning bath in which the concentration of the first component is high, and the first component with an increased concentration is separated and recovered in the solution recovery apparatus. Therefore, cleaning in the impregnation process and recovery of the solvent can be performed more efficiently.

DETAILED DESCRIPTION OF THE EMBODIMENTS

Now, an embodiment of the present invention will be described with reference to the drawings. The present invention provides a solution component recovery apparatus including: a separation section formed with an internal space that stores a solution containing a first component, solidification of which progresses in the absence of oxygen and at a predetermined solidification temperature or higher, and a second component in which the first component is dissolved; an oxygen supply section connected to the separation section to supply oxygen to the solution stored in the separation section; a decompression section that reduces a pressure in the internal space of the separation section; a solution temperature adjustment section that includes a stirring section that stirs the solution stored in the separation section and a heat exchange section that exchanges heat through contact with the solution stored in the separation section to adjust a temperature of the solution to a predetermined separation temperature range below the predetermined solidification temperature; and a recovery section connected to the separation section via a connection pipe through which a fluid can flow to cool and recover the second component evaporated from the solution stored in the separation section, thereby separating and recovering a solution containing a plurality of components. Here, an apparatus that uses a liquid impregnation agent that fills a void formed in a molded workpiece as a first component and a solvent in which the impregnation agent is dissolved as a second component will be described specifically below as an embodiment.

Figure 1:
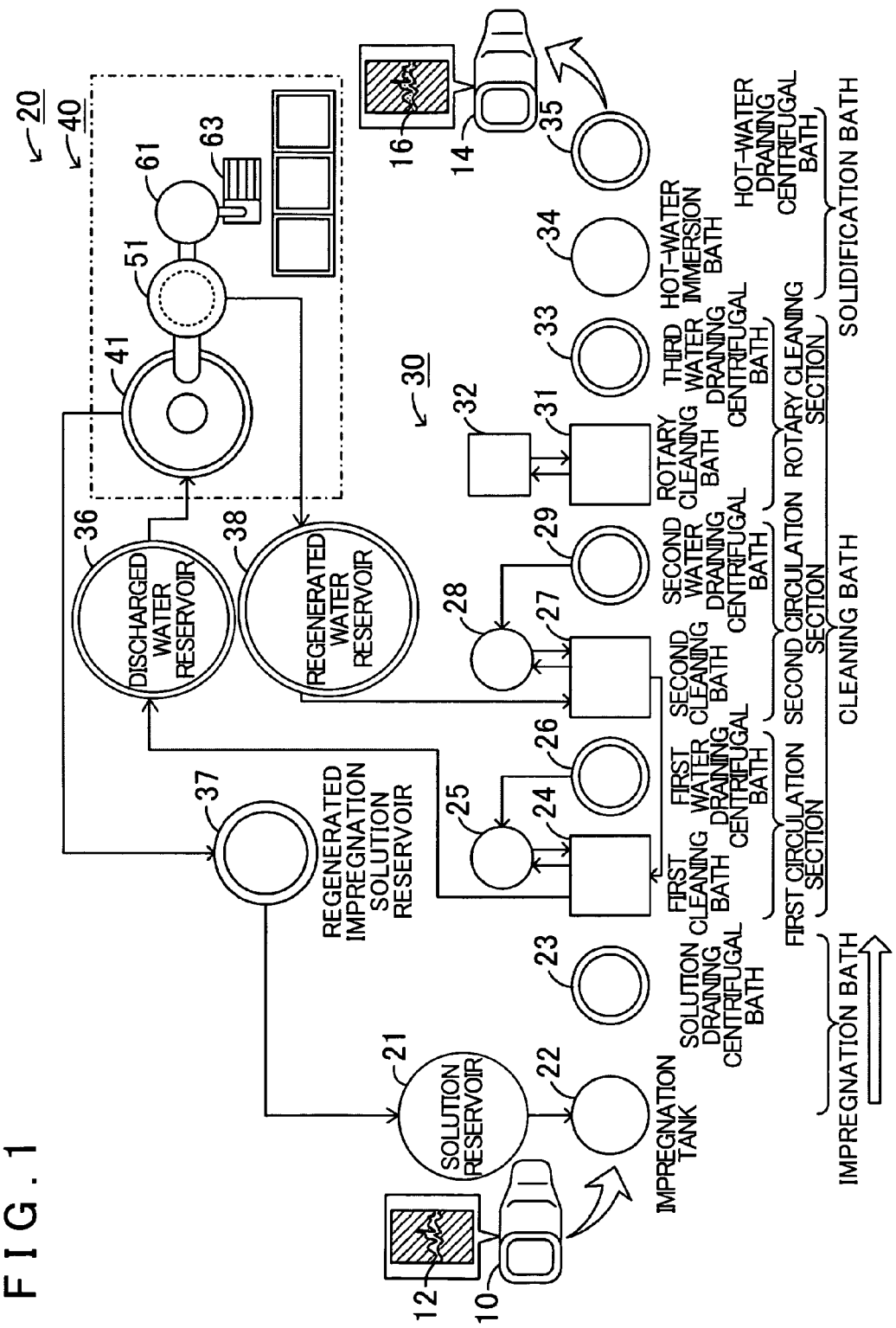
FIG. 1 is a diagram showing a schematic configuration of an impregnation process/impregnation component recovery system 20.
Figure 2:
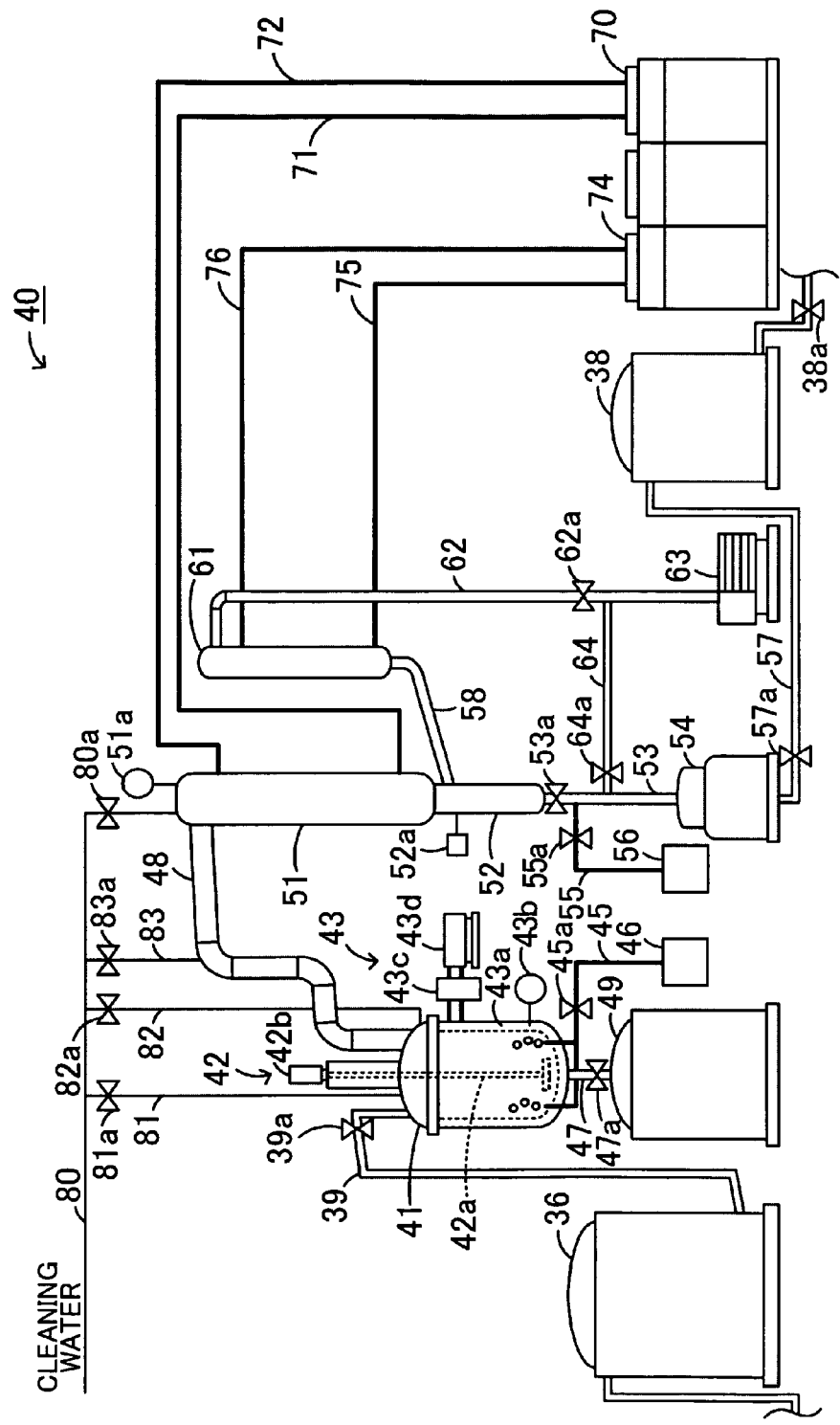
FIG. 2 is a diagram showing a schematic configuration of a solution recovery apparatus 40.

FIG. 1 is a diagram showing a schematic configuration of an impregnation process/impregnation component recovery system 20 according to an embodiment of the present invention. FIG. 2 is a diagram showing a schematic configuration of a solution recovery apparatus 40 according to an embodiment of the present invention. As shown in FIG. 1, the impregnation process/impregnation component recovery system 20 according to the embodiment includes an impregnation process apparatus 30 that impregnates a void in a molded workpiece 10 with an impregnation agent, and the solution recovery apparatus 40 that separates and recovers components contained in a cleaning solution (hereinafter also referred to as a solution) discharged from the impregnation process apparatus 30. The workpiece 10 is a molded body formed by casting, for example. A blowhole 12 which is a void may be formed inside the workpiece 10 during casting. In the impregnation process/impregnation component recovery system 20, the impregnation process apparatus 30 performs a process (impregnation process) in which the blowhole 12 is filled with an impregnation agent to be solidified and discharges a solution containing the cleaning solution and the impregnation agent, and the solution recovery apparatus 40 returns the cleaning solution and the impregnation agent which have been separated and recovered to the impregnation process apparatus 30 to reuse the cleaning solution and the impregnation agent. In the embodiment, an apparatus that uses water as the cleaning solution (a solvent in which the impregnation agent is dissolved) will be described specifically.

The impregnation process apparatus 30 includes an impregnation bath in which the blowhole 12 which is a void formed in the workpiece 10 is filled with the impregnation agent, a cleaning bath in which the workpiece 10 filled with the impregnation agent is cleaned, and a solidification bath in which the impregnation agent filling the blowhole 12 is solidified. The impregnation bath includes a solution reservoir 21 that stores the impregnation agent, an impregnation tank 22 that stores the impregnation agent supplied from the solution reservoir 21 and one or more workpieces 10 to fill the workpieces 10 with the impregnation agent, and a solution draining centrifugal bath 23 in which the impregnation agent is removed from the workpieces 10 filled with the impregnation agent. The solution reservoir 21 stores a monomer that solidifies when heated, for example, as the impregnation agent. The impregnation agent may be, for example, a substance, the solidification reaction of which is promoted when heated to a predetermined solidification temperature or higher, or a substance, the solidification reaction of which is promoted in the absence of oxygen. As the impregnation agent, for example, epoxy resin monomers and acrylic resin monomers may be used. The impregnation agent preferably contains a water-soluble acrylic resin monomer as the main component. Water-soluble methacrylic acid monomers and acrylic acid monomers may be used. It is more preferable to use a water-soluble methacrylic acid monomer. Examples of the methacrylic acid monomer include 2-hydroxyethyl methacrylate, 2-hydroxylpropyl methacrylate, dimethylaminoethyl methacrylate, glycidyl methacrylate, and polyethylene glycol dimethacrylate. Among these, 2-hydroxyethyl methacrylate is more preferable because it has a relatively high effect of filling the blowhole 12. These may be used in combination of two or more kinds. A curing initiator may be mixed in the impregnation agent, and a water-insoluble monomer may be added to the water-soluble monomer. The impregnation tank 22 is provided with a lid (not shown) so as to be tightly sealable. When tightly sealed with the lid, the pressure in the internal space of the impregnation tank 22 can be reduced to degas the blowhole 12, or can be increased to fill the blowhole 12 with the impregnation solution. The solution draining centrifugal bath 23 is provided with a cylindrical outer wall and a cylindrical inner wall portion disposed inside the outer wall so as to be rotatable about an axis, and is configured such that the impregnation solution adhering to the outer wall of the workpiece 10 is subjected to centrifugal separation by rotating the inner wall portion. The impregnation solution collected by a solution drain performed in the solution draining centrifugal bath 23 is supplied to the solution reservoir 21. The configuration of a first water draining centrifugal bath 26, a second water draining centrifugal bath 29, a third water draining centrifugal bath 33, and a hot-water draining centrifugal bath 35 to be discussed later is the same as the configuration of the solution draining centrifugal bath 23, and will not be described herein.

The cleaning bath includes a first circulation section which includes a first cleaning bath 24, a first cleaning solution tank 25, and the first water draining centrifugal bath 26 and in which the workpiece 10 which has been subjected to the impregnation process in the impregnation tank 22 is cleaned and subjected to a solution drain, a second circulation section which includes a second cleaning bath 27, a second cleaning solution tank 28, and the second water draining centrifugal bath 29 and in which the workpiece 10 which has been cleaned in the first circulation section is further cleaned and subjected to a solution drain, and a rotary cleaning section which includes a rotary cleaning bath 31, a third cleaning solution tank 32, and the third water draining centrifugal bath 33 and in which the workpiece 10 which has been cleaned in the second circulation section is finally cleaned and subjected to a solution drain. The first cleaning bath 24 is a tank which can store a cleaning solution supplied from the first cleaning solution tank 25 and in which an unnecessary impregnation agent adhering to the outside of the workpiece 10 is washed away by the flow of the cleaning solution. The first cleaning solution tank 25 is a tank that stores a cleaning solution containing a relatively high concentration of the impregnation agent (here, water containing the impregnation agent) and that is provided with piping through which the cleaning solution can be exchanged with the first cleaning bath 24 and piping through which cleaning water collected in the first water draining centrifugal bath 26 flows into the first cleaning solution tank 25. Thus, the first cleaning bath 24, the first cleaning solution tank 25, and the first water draining centrifugal bath 26 form a circulation path though which a cleaning solution circulates in the first circulation section. Also, the first cleaning bath 24 is provided with piping through which a cleaning solution containing an increased concentration of the impregnation agent is transferred to a waste water reservoir 36 and piping through which a cleaning solution containing a relatively low concentration of the impregnation agent flows into the first cleaning bath 24 from the second cleaning bath 27 in a subsequent stage. The configuration of the second circulation section is the same as the configuration of the first circulation section except that a cleaning solution containing a low concentration of the impregnation agent circulates compared to the first circulation section. The second cleaning bath 27 is provided with piping through which a cleaning solution can be exchanged with the second cleaning solution tank 28 and piping through which cleaning water collected in the second water draining centrifugal bath 29 flows into the second cleaning bath 27. The second cleaning bath 27 is also provided with piping connected to a regenerated water reservoir 38 so that a cleaning solution (water) with high purity separated and recovered in the solution recovery apparatus 40 can flow into the second cleaning bath 27. The second cleaning bath 27 is also provided with piping through which a cleaning solution containing a relatively increased concentration of the impregnation agent is transferred to the first cleaning bath 24. In the rotary cleaning section, the concentration of the impregnation agent in the cleaning solution after cleaning is extremely low, and thus the cleaning solution is exchanged between the rotary cleaning bath 31 and the third cleaning solution tank 32 and the cleaning solution generated in the third water draining centrifugal bath 33 is subjected to a waste solution treatment.

The solidification bath includes a hot-water immersion bath 34 having a heater that can keep a temperature range higher than the solidification temperature of the impregnation agent, and the hot-water draining centrifugal bath 35 in which the workpiece 10 which has been subjected to a solidification process in the hot-water immersion bath 34 is centrifuged to drain hot water. In the impregnation process/impregnation component recovery system 20, the workpiece 10 is heated by hot water to solidify the impregnation agent. Then, the hot water is drained in the hot-water draining centrifugal bath 35 to obtain a workpiece 14 which has been subjected to the impregnation process with an impregnation agent 16 solidified in a void. While the impregnation agent impregnating the inside of the workpiece 10 is heated and solidified in the hot-water immersion bath 34 in the embodiment, the workpiece 10 which has been subjected to the impregnation process may be placed in a hot-air bath that can generate hot air at the solidification temperature of the impregnation agent or higher to heat and solidify the impregnation agent impregnating the inside of the workpiece 10.

The solution recovery apparatus 40 includes a separation section 41 that stores a solution containing the impregnation agent and water to separate the components, an air supply pipe 45 connected to the separation section 41 to supply air to the solution stored inside the separation section 41, a vacuum pump 63 that reduces the pressure in the internal space of the separation section 41, a stirring section 42 and a heat exchange section 43 that adjust the temperature of the solution stored inside the separation section 41, and a primary water recovery section 51 and a secondary water recovery section 61 that cool and recover a water content evaporated in the separation section 41. Also, a discharged water reservoir 36 that stores a solution (cleaning solution) containing the impregnation agent after cleaning and discharged from the impregnation process apparatus 30, a regenerated impregnation solution reservoir 37 that stores an impregnation agent with high purity separated and recovered from the cleaning solution in the solution recovery apparatus 40, and a regenerated water reservoir 38 that stores water with high purity separated and recovered from the cleaning solution in the solution recovery apparatus 40 are provided along with the solution recovery apparatus 40.

The separation section 41 is formed as a tightly sealable, heat-insulating, pressure-resistant vessel that includes an openable lid and that can resist a decompressed state. The upper portion of the separation section 41 is provided with a supply pipe 39 through which a solution from the discharged water reservoir 36 is introduced, a connection pipe 48 through which evaporated water vapor is transferred to the primary water recovery section 51, and the stirring section 42 that stirs the solution stored in the separation section 41. The heat exchange section 43 that exchanges heat with the solution stored in the separation section 41 to adjust the temperature of the solution is provided from the middle to the lower portion of the outer periphery of the separation section 41. The lower portion of the separation section 41 is provided with the air supply pipe 45 through which air is introduced to the solution stored in the internal space of the separation section 41 and an impregnation solution recovery pipe 47 through which the solution stored in the internal space of the separation section 41 is discharged to the outside. The supply pipe 39 is a pressure-resistant pipe that can resist a decompressed state. One end of the supply pipe 39 is connected to the lower portion of the discharged water reservoir 36. The supply pipe 39 is provided with a supply valve 39a which is an electromagnetic valve that is opened to supply the solution. The stirring section 42 includes a stirring shaft 42a which is disposed to extend in the up-down direction of the separation section 41 and at the lower end of which a screw is fixed to stir the solution, and a stirring motor 42b fixed to the upper portion of the separation section 41 to drive the stirring shaft 42a for rotation. The stirring shaft 42a is provided with a sealing portion (not shown) that keeps the internal space of the separation section 41 in a decompressed state. The stirring section 42 is configured such that driving the stirring shaft 42a for rotation causes the solution stored in the separation section 41 to flow toward the wall surface of the separation section 41. The heat exchange section 43 includes a jacket portion 43a that is formed along the outer periphery (wall surface) of the separation section 41 and that can store a coolant, a temperature sensor 43b that detects the temperature of the coolant circulating inside the jacket portion 43a, a heat exchanger 43c that adjusts the temperature of the coolant using heat from a heater and cooling water, and a circulation pump 43d that circulates the coolant. The heat exchange section 43 and the stirring section 42 adjust the temperature of the solution stored in the separation section 41 such that the temperature of the solution is in a predetermined separation temperature range below the predetermined solidification temperature at which solidification of the impregnation agent is promoted. In the embodiment, it is determined on the basis of a detection value of the temperature sensor 43b that separation and recovery of the impregnation agent and water has been terminated when the temperature of the solution from which water is evaporated reaches a predetermined determination temperature to terminate a separation process. The determination temperature may be determined in accordance with the permissible content of water contained in the impregnation agent (for example, 1% by weight, 5% by weight, or 10% by weight) using experimentally obtained relationship of physical properties including the vapor-liquid equilibrium relationship at the operating degree of vacuum and the temperature rise of the solution, for example. Examples of the vapor-liquid equilibrium relationship include the relationship in mixed state (such as mixture ratio) between the impregnation agent and the solvent in a vapor phase evaporated from the solution at a predetermined pressure, and the relationship in concentration and temperature between the impregnation agent and the solvent in the solution. It has been experimentally demonstrated that there is a correlation such that the temperature of the solution rises as the concentration of the impregnation agent contained in the solution which is stored in the separation section 41 and which is under separation at a predetermined pressure rises. Thus, it is possible to know the concentration of the impregnation agent contained in the solution which is under separation using the temperature of the solution. An opening of the air supply pipe 45 is formed in the lower portion of the separation section 41. An air supply pump 46 that supplies air at a predetermined pressure is disposed at the other end of the air supply pipe 45. Therefore, air is stably introduced upward from the opening provided at the lower portion of the separation section 41, which allows uniform supply of oxygen into the solution. The air supply pipe 45 is provided with an air valve 45*a* which is an electromagnetic valve that is opened to supply air. The impregnation solution recovery pipe 47 is disposed to extend downward from the lower portion of the separation section 41. An impregnation solution transfer tank 49 that is movable is disposed at the lower end of the impregnation solution recovery pipe 47. The impregnation agent which has been separated and recovered is transferred to the regenerated impregnation solution reservoir 37 via the impregnation solution transfer tank 49. The impregnation solution recovery pipe 47 is provided with an impregnation solution recovery valve 47*a* which is an electromagnetic valve that is opened to discharge the solution stored in the separation section 41. The connection pipe 48 is a pressure-resistant pipe that can resist a decompressed state. The connection pipe 48 is formed as a tubular member with one end connected to the upper portion of the primary water recovery section 51 so that water vapor evaporated in the separation section 41 can be transferred to the primary water recovery section 51. A heat insulating material is formed around the entire outer periphery of the connection pipe 48 to keep the temperature of the vapor flowing inside the connection pipe 48 as much as possible. Also, bent portions and so forth of the connection pipe 48 are formed to have a smooth curved surface, and portions of the connection pipe 48 that extend in the horizontal direction are formed to be inclined against a horizontal plane downward from the primary water recovery section 51 side to the separation section 41 side. While the connection pipe 48 has one or more portions that extend in the horizontal direction, such portions are thus formed to make it easy for water or the like present inside the pipe to flow to the separation section 41 side.

The primary water recovery section 51 is formed as a cylindrical condenser. Piping through which cooling water (for example, at 5° C. to 10° C.) can circulate via cooling pipings 71 and 72 connected to a cooler 70 is provided inside the primary water recovery section 51. A water reservoir section 52 that recovers condensed water, a water recovery pipe 53 which is disposed at the lower portion of the water reservoir section 52 and through which the recovered water is transferred, a water transfer tank 54 connected to the water recovery pipe 53, and a secondary recovery pipe 58 which is disposed at the upper portion of the water reservoir section 52 and through which water condensed in the secondary water recovery section 61 is introduced into the water reservoir section 52 are provided below the primary water recovery section 51. The upper portion of the primary water recovery section 51 is provided with a pressure sensor 51*a* that can measure the pressure in a recovery path to provide the knowledge of the pressure in the internal space of the separation section 41, the connection pipe 48, and so forth. The upper portion of the water reservoir section 52 is provided with a position sensor 52*a* that detects the level of the recovered water. The water recovery pipe 53 is disposed to extend downward from the lower portion of the water reservoir section 52. The water transfer tank 54 which temporarily stores the recovered water is disposed at the lower end of the water recovery pipe 53. The lower portion of the water transfer tank 54 is provided with one end of a water transfer pipe 57. The water transfer pipe 57 is provided with a transfer valve 57*a* which is an electromagnetic valve. The other end of the water transfer pipe 57 is connected to the regenerated water reservoir 38. The water recovery pipe 53 is provided with a water recovery valve 53*a* which is an electromagnetic valve that is opened to discharge the water stored in the water reservoir section 52. A compression pump 56 is connected to the water recovery pipe 53 via a pressurization pipe 55 and a pressurization valve 55*a*, and a vacuum pump 63 is connected to the water recovery pipe 53 via a decompression pipe 64 and a decompression valve 64*a*. Thus, the compression pump 56 and the vacuum pump 63 can increase and reduce the pressure inside the water recovery pipe 53 and the water transfer tank 54. By reducing and increasing the pressure in the water transfer tank 54, water separated and recovered in the water reservoir section 52 is transferred to the regenerated water reservoir 38 via the water transfer tank 54 and the water transfer pipe 57. The secondary recovery pipe 58 is pressure-resistant pipe that can resist a decompressed state. One end of the secondary recovery pipe 58 is connected to the lower end side of the secondary water recovery section 61. Bent portions of the secondary recovery pipe 58 are formed to have a smooth curved surface, and portions of the secondary recovery pipe 58 that extend in the horizontal direction are formed to be inclined against a horizontal plane downward from the secondary water recovery section 61 side to the water reservoir section 52 side. Thus, the secondary recovery pipe 58 is formed to make it easy for water present in the pipe to flow to the water reservoir section 52 side.

The secondary water recovery section 61 is formed as a cylindrical condenser. Piping through which cooling water can circulate via cooling pipings 75 and 76 connected to a cooler 74 is provided inside the secondary water recovery section 61. Cooling water at a temperature (for example, 0° C. to 5° C.) lower than the temperature of the cooling water in the primary water recovery section 51 circulates in the secondary water recovery section 61 to prevent water vapor or the like from being discharged to a subsequent stage. The upper portion of the secondary water recovery section 61 is provided with a vacuum connection pipe 62. The other end of the vacuum connection pipe 62 is connected to the vacuum pump 63. A vacuum valve 62*a* which is an electromagnetic valve is connected to the vacuum connection pipe 62. The vacuum pump 63 preferably has a pressure reduction capability that can reduce the pressure in the internal space of the separation section 41 to several Torr, for example. Thus, in the solution recovery apparatus 40, the pressure in the separation section 41 and the supply pipe 39 can be reduced via the vacuum connection pipe 62, the secondary water recovery section 61, the secondary recovery pipe 58, the water reservoir section 52, the primary water recovery section 51, and the connection pipe 48 by driving the vacuum pump 63, and water serving as a solvent can be evaporated from the solution stored in the separation section 41 and recovered in the water reservoir section 52. Connection portions of the pipings and the valves are connected in such a way that can resist decompression. Also, the solution recovery apparatus 40 is configured such that drive devices such as pumps that transfer the solution, the separated water, and so forth are not disposed in the supply pipe 39, the connection pipe 48, and the vacuum connection pipe 62 and water or the like which has been recovered is transferred by the pressure difference produced by the vacuum pump 63 and so forth. Since drive devices are not disposed in portions through which the solution flows under a reduced pressure, it is possible to prevent the occurrence of a failure that the impregnation agent solidifies in the drive devices.

Cleaning water piping 80 is connected to the connection pipe 48 and the separation section 41 so that the inside of the connection pipe 48 and the separation section 41 can be cleaned. In the embodiment, the cleaning water piping 80 is connected via a cleaning valve 80*a* to the connection portion of the connection pipe 48 to the primary water recovery section 51, a stirring section cleaning pipe 81 is connected via a cleaning valve 81a to the connection portion of the stirring shaft 42a to the separation section 41, a separation section cleaning pipe 82 is connected via a cleaning valve 82a to clean the internal space of the separation section 41, and a connection section first cleaning pipe 83 is connected via a cleaning valve 83a to clean the lower horizontal portion of the connection pipe 48. In the embodiment, the connection pipe 48 is disposed to be inclined such that water flows to the separation section 41 side, and thus the cleaning water having cleaned the inside of the connection pipe 48 flows into the internal space of the separation section 41 while dissolving the impregnation agent adhering to the inside of the pipe. Therefore, the cleaning water having cleaned the connection pipe 48, the stirring section 42, and the separation section 41 can also be separated and recovered in the same way as the cleaning solution supplied from the discharged water reservoir 36.

Figure 3:
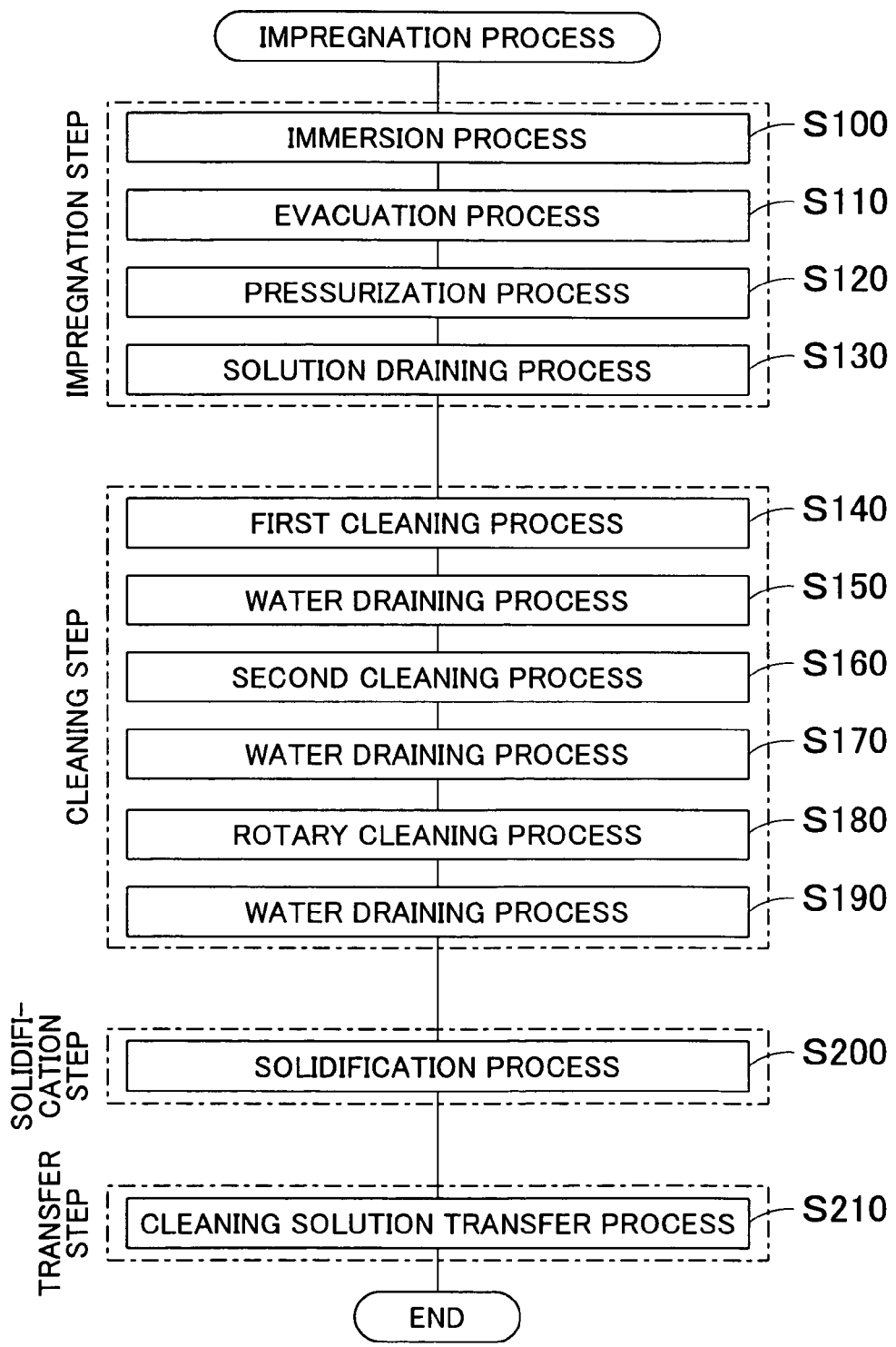
FIG. 3 is a flowchart showing an exemplary impregnation process.
Figure 4:
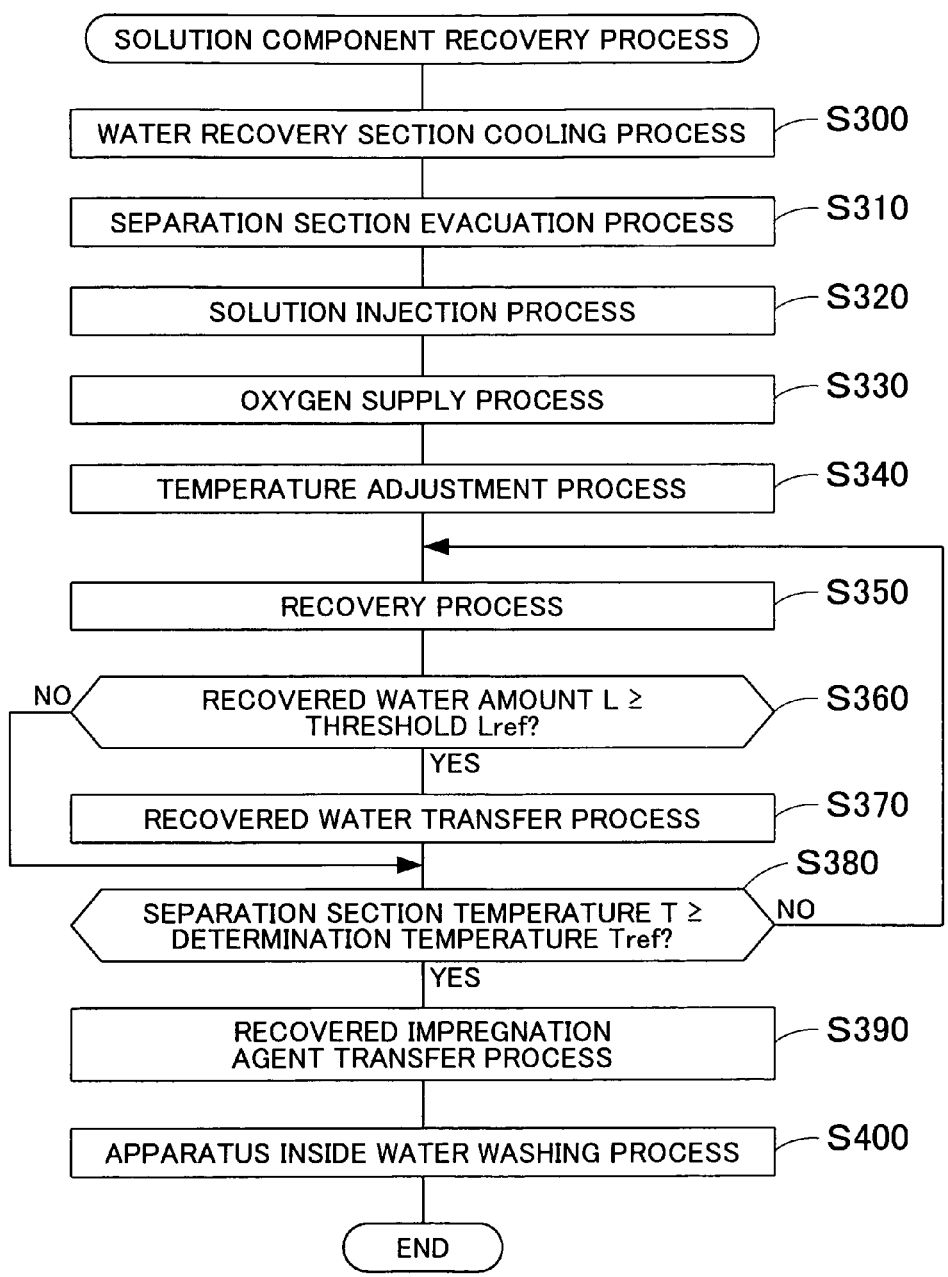
FIG. 4 is a flowchart showing an exemplary solution component recovery process.

Now, the impregnation process performed on the workpiece 10 in the impregnation process/impregnation component recovery system 20 and the method for recovering components contained in the cleaning solution (solution) discharged in the impregnation process will be described with reference to the drawings. FIG. 3 is a flowchart showing an exemplary impregnation process. FIG. 4 is a flowchart showing an exemplary solution component recovery process. The impregnation process may include an impregnation step in which a void formed in the molded workpiece 10 is impregnated with an impregnation agent, a cleaning step in which the workpiece 10 impregnated with the impregnation agent is cleaned using a cleaning solution (a solvent in which an impregnation solution is dissolved), a solidification step in which the impregnation agent impregnating the workpiece 10 is solidified, and a transfer step in which a cleaning solution, the concentration of the impregnation agent in which has been increased in the cleaning step, is transferred to the solution recovery apparatus 40 side. As the impregnation agent, for example, epoxy resin monomers and acrylic resin monomers may be used. The impregnation agent preferably contains a water-soluble acrylic resin monomer as the main component. Water-soluble methacrylic acid monomers and acrylic acid monomers may be used. It is more preferable to use a water-soluble methacrylic acid monomer. As the cleaning solution, water may be used. Examples of the water-soluble methacrylic acid monomer include 2-hydroxylethyl methacrylate, 2-hydroxylpropyl methacrylate, dimethylaminoethyl methacrylate, glycidyl methacrylate, and polyethylene glycol dimethacrylate. Among these, 2-hydroxylethyl methacrylate is more preferable because it has a relatively high effect of filling the blowhole 12. A curing initiator may be mixed in the impregnation agent, and a water-insoluble monomer may be added to the water-soluble monomer. Here, a case where 2-hydroxylethyl methacrylate, the solidification reaction of which progresses without coexistence of oxygen and at 30° C. or higher, is used as the impregnation agent and water serving as the solvent is used as the cleaning agent will be mainly described.

When the impregnation process is started, first, an immersion process (step S100) in which an impregnation agent is introduced from the solution reservoir 21 into the impregnation tank 22 and one or more workpieces 10 are immersed in the impregnation tank 22 is performed as shown in FIGS. 1 and 3. An evacuation process (step S110) in which the impregnation tank 22 is tightly sealed with a lid (not shown) and a vacuum pump (not shown) is driven to reduce the pressure inside the impregnation tank 22 is performed. Then, the blowhole 12 (void) formed in the workpiece 10 is degassed so that the impregnation agent penetrates into the blowhole 12. Next, a pressurization process (step S120) in which a pressurization pump (not shown) is driven to increase the pressure inside the impregnation tank 22 is performed to better fill the inside of the blowhole 12 with the impregnation agent. Subsequently, the workpiece 10 is moved from the impregnation tank 22 to the solution draining centrifugal bath 23 to be subjected to a solution draining process (step S130). When this process is performed, the impregnation step is terminated.

Next, the workpiece 10 which has been subjected to the solution draining process is moved to the first cleaning bath 24. A first cleaning process (step S140) is performed on the workpiece 10 by supplying a cleaning solution with a relatively high concentration of the impregnation agent (for example, 10 to 40% by weight) from the first cleaning solution tank 25 to the first cleaning bath 24. The workpiece 10 is moved to the first water draining centrifugal bath 26 to be subjected to a water draining process (step S150). At this time, the cleaning solution in the first circulation section circulates through the first cleaning bath 24 and the first cleaning solution tank 25, and the cleaning solution discharged from the first water draining centrifugal bath 26 is returned to the first cleaning solution tank 25. The cleaning solution in the first circulation section contains an increasing concentration of the impregnation agent each time the workpiece 10 is cleaned. Next, the workpiece 10 is moved from the first water draining centrifugal bath 26 to the second cleaning bath 27. A second cleaning process (step S160) is performed on the workpiece 10 by supplying a cleaning solution with a relatively low concentration of the impregnation agent (for example, 1 to 20% by weight) from the second cleaning solution tank 28 to the second cleaning bath 27. The workpiece 10 is moved to the second water draining centrifugal bath 29 to be subjected to a water draining process (step S170). At this time, the cleaning solution in the second circulation section circulates through the second cleaning bath 27 and the second cleaning solution tank 28, and the cleaning solution discharged from the second water draining centrifugal bath 29 is returned to the second cleaning solution tank 28. The cleaning solution in the second circulation section contains an increasing concentration of the impregnation agent each time the workpiece 10 is cleaned, although the concentration of the impregnation solution is not high compared to the first circulation section. Subsequently, the workpiece 10 subjected to the water draining process is moved to the rotary cleaning bath 31. A rotary cleaning process (step S180) is performed on the workpiece 10 by supplying a cleaning solution from the third cleaning solution tank 32 to the rotary cleaning bath 31. The workpiece 10 is moved to the third water draining centrifugal bath 33 to be subjected to a water draining process (step S190). When this process is performed, the cleaning step is terminated.

Next, a solidification process (step S200) is performed for the impregnation agent contained in the workpiece 10 which has undergone the cleaning step. In this process, the workpiece 10 is moved from the third water draining centrifugal bath 33 to the hot-water immersion bath 34 to be subjected to a hot-water immersion process for a period in which solidification of the impregnation agent is terminated at a temperature at which the impregnation agent is solidified (for example, 80° C. to 100° C.). The workpiece 10 is moved to the hot-water draining centrifugal bath 35 to be subjected to a hot-water draining process. A drying process etc. is appropriately performed to obtain a workpiece 14 which has been subjected to the impregnation process. In place of the hot-water immersion process, the solidification process may be implemented by a hot-air process in which hot air at the solidification temperature or higher is applied to the workpiece 10 to solidify the impregnation agent. In this way, the hot-water draining process and the drying process can be dispensed with. The method for solidification process may be selected appropriately depending on the impregnation agent.

After the solidification process, when the concentration of the impregnation agent in the cleaning solution stored in the first cleaning solution tank 25 reaches a predetermined recovery concentration (for example, 20% by weight or 30% by weight), for example, a cleaning solution transfer process (step S210) in which a first cleaning solution stored in the first cleaning solution tank 25 is transferred to the discharged water reservoir 36 is performed to terminate this routine. At this time, the concentration of the impregnation agent in a second cleaning solution stored in the second cleaning solution tank 28 has also been increased, and thus the second cleaning solution is transferred from the second cleaning bath 27 to the first cleaning bath 24. Also, recovered water with high purity stored in the regenerated water reservoir 38 to be discussed later is transferred to the second cleaning bath 27. Thus, the second circulation section and the first circulation section repeatedly perform a cleaning process, and the concentration of the impregnation agent contained in each cleaning solution is increased. In this way, the solution recovery apparatus 40 can easily separate and recover the solvent and the impregnation agent.

Now, the process for recovering the solution component discharged from the impregnation process apparatus 30 will be described. This process is executed using the solution recovery apparatus 40 shown in FIG. 2. First, in the solution component recovery process, a cooling process (step S300) is performed for the primary water recovery section 51 and the secondary water recovery section 61 by starting the coolers 70 and 74. An evacuation process (step S310) is performed for the separation section 41. The evacuation process for the separation section 41 is performed by the vacuum pump 63 via the vacuum connection pipe 62, the secondary water recovery section 61, the secondary recovery pipe 58, the water reservoir section 52, the primary water recovery section 51, and the connection pipe 48 with the supply valve 39a, the impregnation solution recovery valve 47a, and the water recovery valve 53a closed and with the vacuum valve 62a opened. Next, a solution injection process (step S320) in which the solution (cleaning solution) containing the impregnation agent and stored in the discharged water reservoir 36 is introduced into the separation section 41 is performed. In this process, the pressure in the internal space of the separation section 41 has been reduced, and thus the solution is naturally introduced into the separation section 41 via the supply pipe 39 by opening the supply valve 39a. Next, an oxygen supply process (step S330) in which the air supply pump 46 is driven to supply air into the solution via the air supply pipe 45 is performed. This process is particularly effective for impregnation agents, the solidification reaction of which progresses without coexistence of oxygen, for example in the case where 2-hydroxyethyl methacrylate is used as the impregnation agent. When a predetermined quantity of the solution is injected into the separation section 41, the supply valve 39a is closed. Next, a temperature adjustment process (step S340) in which the temperature of the solution stored in the separation section 41 is adjusted by driving the stirring motor 42b of the stirring section 42 and starting the heat exchanger 43c and the circulation pump 43d of the heat exchange section 43 is performed. In this process, the temperature of the solution is controlled to a temperature range which is lower than the solidification temperature at which solidification of the impregnation agent progresses and in which water does not freeze. The temperature range is preferably a range of 5° C. or higher to 30° C. or lower, more preferably 25° C. or lower, further more preferably 20° C. or lower.

Subsequently, a recovery process (step S350) in which the internal space of the separation section 41 is brought into a predetermined decompressed state to evaporate and recover water from the solution. In this process, for example, it is more preferable to evaporate water by reducing the pressure of the solution containing the impregnation agent and water to a predetermined reduced pressure range in which evaporation of water progresses but the progress of evaporation of the impregnation agent is suppressed. The reduced pressure range can be obtained empirically from the relationship between a measurement value of the pressure sensor 51a and the amount of the impregnation agent contained in the recovered water recovered in the water reservoir section 52. Because solidification of the impregnation agent contained in the solution progresses in an anaerobic state, it is more preferable to empirically obtain a reduced pressure range for use in the recovery process in which solidification of the impregnation agent can be suppressed better and evaporation of water can be promoted, in order to avoid a situation where the pressure is reduced too much to promote evaporation of water and the amount of oxygen in the solution is accordingly reduced too much. Further, because solidification of the impregnation agent contained in the solution progresses at the predetermined solidification temperature or higher, the reduced pressure range for use in the recovery process may be obtained empirically from the relationship with the solidification temperature of the impregnation agent. For example, the reduced pressure range may be set such that the temperature of the boiling point of the solvent is in a range of 10° C. or higher to 30° C. or lower, more preferably in a range of 10° C. or higher to 25° C. or lower. Evaporation of the solvent is easily promoted at 30° C. or lower, and the evaporated solvent is easily condensed in a subsequent stage at 10° C. or higher. The reduced pressure range is preferably in a range of 0.5 kPa or higher to 10 kPa or lower, more preferably in a range of 1 kPa or higher to 5 kPa or lower, for example. Reducing the pressure in the internal space of the separation section 41 as described above allows the solution to boil around the room temperature. Thus, evaporation of water serving as the solvent is promoted while suppressing the progress of the solidification reaction of the impregnation agent contained in the solution. When the recovery process is performed, the concentration of the impregnation agent in the solution stored in the separation section 41 is increased, and the evaporated water is recovered in the water reservoir section 52.

Subsequently, it is determined on the basis of a detection value of the position sensor 52a (see FIG. 2) whether or not a recovered water amount L of the water recovered in the water reservoir section 52 is a predetermined threshold Lref or more (step S360). If the recovered water amount L is the predetermined threshold Lref or more, a recovered water transfer process (step S370) in which the recovered water stored in the water reservoir section 52 is transferred to the water transfer tank 54 is performed. This process can be performed by reducing the pressure inside the water recovery pipe 53 and the water transfer tank 54 with the water recovery valve 53a, the pressurization valve 55a, and the transfer valve 57a closed and with the decompression valve 64a opened and then closing the decompression valve 64a and opening the water recovery valve 53a. When the water transfer tank 54 is decompressed, the recovered water stored in the water reservoir section 52 is naturally sucked out to the water transfer tank 54 side as the water recovery valve 53a is opened. When the water transfer tank 54 is filled up to the permissible level, the recovered water stored in the water transfer tank 54 can be transferred to the regenerated water reservoir 38 via the water transfer pipe 57 by increasing the pressure inside the water transfer tank 54 with the water recovery valve 53*a*, the transfer valve 57*a*, and the decompression valve 64*a* closed and the pressurization valve 55*a* opened and then opening the transfer valve 57*a*.

After step S370 or if the recovered water amount L is not the predetermined threshold Lref or more in step S360, it is determined on the basis of a detection value of the temperature sensor 43*b* whether or not a temperature T of the separation section 41 is a predetermined threshold Tref or more (step S380). In the embodiment, it is determined that separation and recovery of the impregnation agent and water has been terminated when the temperature T of the solution evaporating water reaches the predetermined determination temperature Tref to terminate the separation process. The determination temperature Tref may be determined in accordance with the permissible content of water contained in the impregnation agent (for example, 1% by weight, 5% by weight, or 10% by weight) using experimentally obtained relationship between the temperature at which water is evaporated and the content of water in the solution, for example. If it is determined that the separation section temperature T is not the predetermined threshold Tref or more, it is determined that the solution has not been sufficiently separated and recovered yet, and the processes in and after step S350 are repeated. On the other hand, if it is determined that the separation section temperature T is the predetermined threshold Tref or more, it is determined that the solution stored in the separation section 41 has become an impregnation agent with high purity containing the solvent in an amount less than the permissible content, and a recovered impregnation agent transfer process (step S390) in which the recovered impregnation agent is transferred is performed. In this process, the internal space of the separation section 41 is brought to the normal pressure and the impregnation solution recovery valve 47*a* is opened to transfer the solution in the separation section 41 to the impregnation solution transfer tank 49 via the impregnation solution recovery pipe 47 under its own weight. Then, the solution (impregnation agent with high purity) stored in the impregnation solution transfer tank 49 is introduced into the regenerated impregnation solution reservoir 37.

When the solvent and the impregnation agent contained in the solution are separated and recovered as described above, a water washing process (step S400) is appropriately performed inside the apparatus to terminate this routine. In the water washing process, cleaning water is supplied to the inside of the separation section 41, the stirring section 42, and the connection pipe 48 via the cleaning water piping 80, the impregnation agent adhering to the inside of the apparatus is washed away, and the solution having cleaned the workpiece 10 is stored in the separation section 41. The solution stored in the separation section 41 in the water washing process may be subjected to separation and recovery processes together with a new solution introduced next time.

Now, the correspondence between the constituent elements of the embodiment and the constituent elements of the present invention is clarified. The separation section 41 of the embodiment corresponds to the separation section of the present invention, the air supply pipe 45 and the air supply pump 46 correspond to the oxygen supply section, the air supply pipe 45 corresponds to the supply pipe, the air supply pump 46 corresponds to the pressure adjustment section, the vacuum connection pipe 62, the secondary water recovery section 61, the secondary recovery pipe 58, the water reservoir section 52, the primary water recovery section 51, the connection pipe 48, and the vacuum pump 63 correspond to the decompression section, the stirring section 42 and the heat exchange section 43 correspond to the solution temperature adjustment section, and the primary water recovery section 51 and the secondary water recovery section 61 correspond to the recovery section. In the embodiment, an example of the solution component recovery method according to the present invention is also clarified by describing the operation of the impregnation process/impregnation component recovery system 20.

According to the impregnation process/impregnation component recovery system 20 described above, a solution containing an impregnation agent, solidification of which progresses in the absence of oxygen and at a predetermined solidification temperature or higher, and a solvent in which the impregnation agent is dissolved is stored in the separation section 41. The pressure in the internal space of the separation section 41 is reduced while supplying air (oxygen) to the solution stored in the separation section 41, with the stirring section 42 stirring the solution and with the heat exchange section 43 adjusting the temperature of the solution to a predetermined separation temperature range below the predetermined solidification temperature, to evaporate the solvent. The evaporated solvent is cooled and recovered by the primary water recovery section 51 and the secondary water recovery section 61. By separating the impregnation agent and the solvent at a reduced pressure and in the predetermined separation temperature range while supplying oxygen as described above, solidification of the impregnation agent is prevented. Thus, the recovered components can be reused better. The system is provided with the air supply pipe 45, an opening of which is formed in the lower portion of the separation section 41, and the air supply pump 46 which supplies air at a predetermined pressure to the air supply pipe 45. Therefore, the solution can be supplied with oxygen in a more constant supply amount, which suppresses the solidification of the impregnation agent content better and consequently allows to reuse the impregnation agent further better. Further, the connection pipe 48 and the secondary recovery pipe 58 are formed to have a smooth curved surface, and portions of the connection pipe 48 and the secondary recovery pipe 58 that extend in the horizontal direction are formed to be inclined against a horizontal plane. Therefore, a liquid condensed in the pipes can easily flow to better prevent the pipes from being blocked inside. Moreover, portions of the connection pipe 48 that extend in the horizontal direction are formed to be inclined against a horizontal plane downward from the primary water recovery section 51 side to the separation section 41 side. Therefore, a liquid in the connection pipe 48 can easily flow to the separation section 41 side, which allows the liquid to be subjected to another separation process in the separation section, for example, in order to be reused. Furthermore, the jacket portion 43*a* of the heat exchange section 43 is disposed along the wall surface of the separation section 41 and the stirring section 42 causes the solution stored in the separation section 41 to flow toward the wall surface of the separation section 41 in order to separate the impregnation agent and the solvent. Therefore, the temperature distribution can be kept more uniform and the uniformity of the solution components can be kept better, which prevents solidification of the impregnation agent better and allows to reuse the impregnation agent further better. Separation between the impregnation agent and the solvent is terminated when the temperature T of the solution from which evaporation is performed reaches the predetermined determination temperature Tref. Therefore, the termination of the separation process can be determined relatively easily using the temperature of the solution, and consequently the recovered components can be reused more easily.

Also, in the impregnation process/impregnation component recovery system 20, after execution of a process in which a workpiece is impregnated, components contained in a solution discharged as a waste solution can be recovered in the solution recovery apparatus 40 to be reused in the impregnation process apparatus 30. Further, the solvent recovered in the primary water recovery section 51 and the secondary water recovery section 61 is utilized in the second circulation section in which the concentration of the impregnation agent is low, the cleaning solution utilized in the second circulation section is further utilized in the first circulation section in which the concentration of the impregnation agent is high, and the impregnation agent with an increased concentration is separated and recovered in the solution recovery apparatus 40. Therefore, cleaning in the impregnation process and recovery of the solvent can be performed more efficiently. Furthermore, the solution recovery apparatus 40 supplies the impregnation agent recovered in the separation section 41 to the impregnation bath. Therefore, the impregnation agent can be reused more efficiently. In general, a solvent containing a minute amount of an impregnation agent is occasionally subjected to a purification process and then disposed of. However, by utilizing the recovered solvent as a cleaning solvent for which even a solvent containing an impregnation agent can be utilized as it is, the solvent can be reused more efficiently. In addition, a purification process to be performed on the recovered solvent can be dispensed with.

It should be understood that the present invention is not limited to the embodiment discussed above in any way, and may be implemented in various aspects without departing from the technical scope of the present invention.

For example, a first component is an impregnation agent and a second component is a solvent in the embodiment discussed above. However, the present invention is not specifically limited thereto as long as the first component is a component, solidification of which proceeds at a predetermined solidification temperature or higher, and the second component is a component in which the first component is dissolved. For example, the first component may be a monomer that is dissolvable in an organic solvent, and the second component may be an organic solvent in which the monomer is dissolved. Examples of the monomer that is dissolvable in an organic solvent include alkyl methacrylates such as lauryl (meth)acrylate, tridecyl(meth)acrylate, stearyl(meth)acrylate, and 2-ethylhexyl(meth)acrylate, and (meth)acrylates of polyhydric alcohols such as ethylene glycol di(meth)acrylate, diethylene glycol di(meth)acrylate, 1,2-propylene glycol di(meth)acrylate, dipropylene glycol di(meth)acrylate, 1,4-butanediol di(meth)acrylate, 1,6-hexanediol di(meth)acrylate, 1,9-nonanediol di(meth)acrylate, and trimethylol propane trimethacrylate. These may be used in combination of two or more kinds. The organic solvent in which the monomer is dissolved is not specifically limited, but is preferably a solvent that is highly compatible with the monomer that is dissolvable in an organic solvent and that has a boiling point that is significantly different from the boiling point of the monomer that is dissolvable in an organic solvent. Examples of the organic solvent include chlorinated hydrocarbons such as methylene chloride, lower alcohols such as methanol, ethanol, n-propanol, and isopropanol, aromatic hydrocarbons such as benzene, toluene, and xylene, and ketones such as acetone, methyl ethyl ketone, diethyl ketone, and methyl isobutyl ketone.

In the embodiment discussed above, the impregnation agent and the solvent recovered in the solution recovery apparatus 40 are reused in the impregnation process apparatus 30. However, the present invention is not specifically limited thereto, and the impregnation agent and the solvent recovered in the solution recovery apparatus 40 may be utilized elsewhere. While the impregnation process/impregnation component recovery system 20 includes the impregnation process apparatus 30 and the solution recovery apparatus 40 in the embodiment discussed above, the impregnation process/impregnation component recovery system 20 may include only the solution recovery apparatus 40. Further, the present invention may be implemented as a solution component recovery method for separating and recovering a solution containing a plurality of components in which the pressure of the solution is reduced in a separation temperature range to evaporate the second component.

While a component, solidification of which progresses in the absence of oxygen and at a predetermined solidification temperature or higher, is used as the first component in the embodiment discussed above, a component, solidification of which does not progress in the absence of oxygen, may be used as the first component to separate and recover the first component and the second component. In this way, the first component and the second component can be separated and recovered without supplying oxygen.

While the air supply pipe 45 and the air supply pump 46 are provided to supply a uniform amount of air (oxygen) to the solution stored in the separation section 41 in the embodiment discussed above, any configuration may be adopted as long as oxygen can be supplied to the solution. For example, the air supply pump 46 may be dispensed with. Also in this way, air is supplied to the internal space of the separation section 41 via the air supply pipe 45 when the pressure in the internal space of the separation section 41 is reduced. The absence of the air supply pump 46 makes it difficult to supply air uniformly, but allows to achieve a simple configuration.

In the embodiment discussed above, portions of the connection pipe 48 and the secondary recovery pipe 58 that are formed to extend horizontally are inclined. However, the present invention is not specifically limited thereto, and portions of the connection pipe 48 and the secondary recovery pipe 58 that are formed to extend horizontally may not be inclined. Also, in the embodiment discussed above, the connection pipe 48 and the secondary recovery pipe 58 are formed to have a smooth curved surface. However, the present invention is not specifically limited thereto, and the connection pipe 48 and the secondary recovery pipe 58 may not be formed to have a smooth curved surface. Also in this way, the recovered components can be reused better.

In the embodiment discussed above, the jacket portion 43a of the heat exchange section 43 is disposed along the wall surface of the separation section 41 and the stirring section 42 causes the solution stored in the separation section 41 to flow toward the wall surface of the separation section 41 in order to separate the impregnation agent and the solvent. However, the present invention is not specifically limited thereto, and any method may be used as long as a stirring section that stirs the solution and a heat exchange section that exchanges heat through contact with the solution stored in the separation section are provided to adjust the temperature of the solution to a predetermined separation temperature range.

In the embodiment discussed above, separation between the impregnation agent and the solvent is terminated when the temperature T of the solution from which evaporation is performed reaches the predetermined determination temperature Tref. However, the present invention is not specifically limited thereto, and it is possible to determine that separation between the first component and the second component has been terminated using a parameter that provides the knowledge of the concentration of the second component contained in the first component. The temperature of the jacket portion 43a may be measured to be used as the temperature of the solution stored in the separation section 41, or the temperature of the solution stored in the separation section 41 may be measured directly. Each determination process may be performed by either an operator or a computer.

In the embodiment discussed above, in the impregnation process/impregnation component recovery system 20, the solution is separated by centrifugation in the solution draining centrifugal bath 23, the first water draining centrifugal bath 26, the second water draining centrifugal bath 29, the third water draining centrifugal bath 33, and the hot-water draining centrifugal bath 35. However, the present invention is not specifically limited thereto, and the solution may be separated by vibration, for example. The impregnation process/impregnation component recovery system 20 includes, as three cleaning baths, the first circulation section, the second circulation section, and the rotary cleaning section. However, the present invention is not specifically limited thereto, and the impregnation process/impregnation component recovery system 20 may include at least one cleaning bath. The impregnation process/impregnation component recovery system 20 preferably includes two or more cleaning baths from the viewpoint of cleaning off an excessive portion of the impregnation agent.

In the embodiment discussed above, in the impregnation process, the impregnation solution is introduced from the solution reservoir 21 and the workpiece 10 is immersed in the impregnation tank 22. However, it is also possible to adopt a method in which the impregnation agent is stored in advance in the impregnation tank 22 and the workpiece 10 is placed at such a height that the workpiece 10 is not immersed in the liquid, and the workpiece 10 is immersed using an ascending/descending device or the like after the pressure is reduced. In the embodiment discussed above, in the impregnation process, a pressurization process in which a pressurization pump is driven to increase the pressure inside the impregnation tank 22 is performed to impregnate the workpiece 10 with the impregnation agent. However, the pressure may be returned to the atmospheric pressure without using a pressurization pump to apply a pressure of 1 atmospheric pressure.

In the embodiment discussed above, the separation section 41 separates a water-soluble acrylic resin monomer serving as an impregnation agent that impregnates the blowhole 12 in the workpiece 10 to be cured as the first component and water serving as a solvent in which the impregnation agent is dissolved as the second component. However, the present invention is not specifically limited thereto. For example, the separation section 41 may separate a substance which contains a water-soluble acrylic resin monomer as the main component but which is not an impregnation agent that impregnates the workpiece 10 as the first component and water serving as a solvent in which the substance is dissolved as the second component. Alternatively, the separation section 41 may separate a substance which contains a monomer serving as an impregnation agent that impregnates the workpiece 10 as the main component but which is not a water-soluble acrylic resin monomer as the first component and water or a solvent other than water in which the impregnation agent is dissolved as the second component.

A specific example in which an impregnation agent and a solvent were separated and recovered using the impregnation process/impregnation component recovery system 20 will be described below as an example.

A solution in which 2-hydroxylethyl methacrylate was used as the impregnation agent and water was used as the solvent. The concentration of the impregnation agent in the solution was 36% by weight. The solution was stored in the separation section 41 of FIG. 2. A separation process was performed with the temperature of the jacket portion 43a being 28° C., the pressure inside the separation section 41 reduced to 1.33 kPa, the amount of air supplied from the air supply pipe 45 being 0.5 L/minute, and the cooling temperature of the primary water recovery section 51 being 6 to 8° C., until the temperature inside the separation section 41 became 28° C. As a result, the amount of the recovered impregnation agent was 28.7 kg, the purity of the impregnation agent was 95.5% by weight, and the water content of the impregnation agent was 1.8% by weight. Also, the amount of the recovered water was 48.4 kg, the content of organic matter was 0.8%, and CODMn was 7900 mg/L. When the recovery process was repeated three times, the viscosity of the recovered impregnation agent was constant at 7.8 to 8.1 mPa·s. Thus, it is inferred that the impregnation agent did not deteriorate even through the repeated recovery processes. Thus, it became clear that the use of the solution recovery apparatus 40 allowed to reuse the recovered components better. It was experimentally demonstrated that there was a correlation such that the temperature of the solution in the separation section 41 rose as the concentration of the impregnation agent contained in the solution which was stored in the separation section 41 and which was under separation rose. Therefore, it was found possible to separate and recover an impregnation agent at a desired concentration by observing the temperature of the solution.

The present invention is applicable to an industry related to the recovery of solution components.

What is claimed is:

1. A method of recovering a solution component in an impregnation process/impregnation component recovery system including an impregnation step, a cleaning step and a solidification step, the method of recovering by separating a plurality of components contained in a solution for recovery, the method comprising the steps of:

impregnating voids in a molded workpiece with a first component, the first component being a water-soluble monomer;

cleaning the workpiece with a cleaning solution comprising a second component, the second component being a solvent into which the first component is capable of being dissolved;

solidifying the first component impregnated in the voids by heating the workpiece to a solidification temperature, the solidification temperature being a temperature at which the first component solidifies;

separating from the cleaning solution, between the first component and the second component, by reducing the pressure on the cleaning solution, setting the boiling point of the second component to a temperature that is less than the solidification temperature of the first component, and evaporating the second component without solidifying the first component; and recovering the second component evaporated in the separation step by cooling;

wherein the separation step is terminated when it is determined that separation between the first component and the second component has been terminated when a temperature of the solution from which the second component is evaporated reaches a determination temperature that is determined in accordance with the permissible content of water contained in the first component.

2. The solution component recovery method according to claim 1, wherein
the first component is a component, solidification of which progresses in the absence of oxygen, and
the second component is evaporated by reducing the pressure of the solution while supplying oxygen to the cleaning solution in the separation step.

3. The solution component recovery method according to claim 1, wherein the first component contains a water-soluble acrylic resin monomer, and
the second component is water.

* * * * *